UNITED STATES PATENT OFFICE.

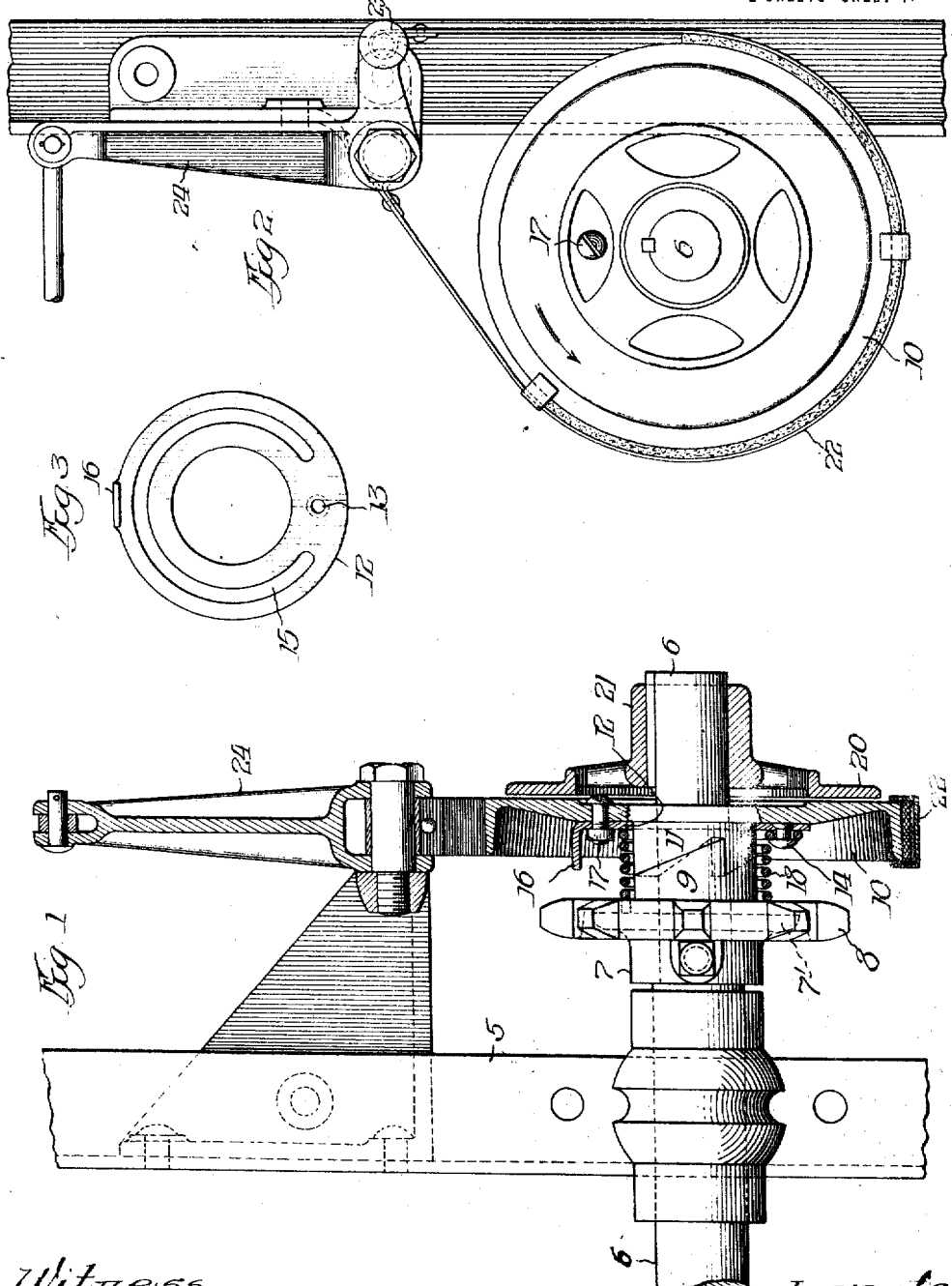

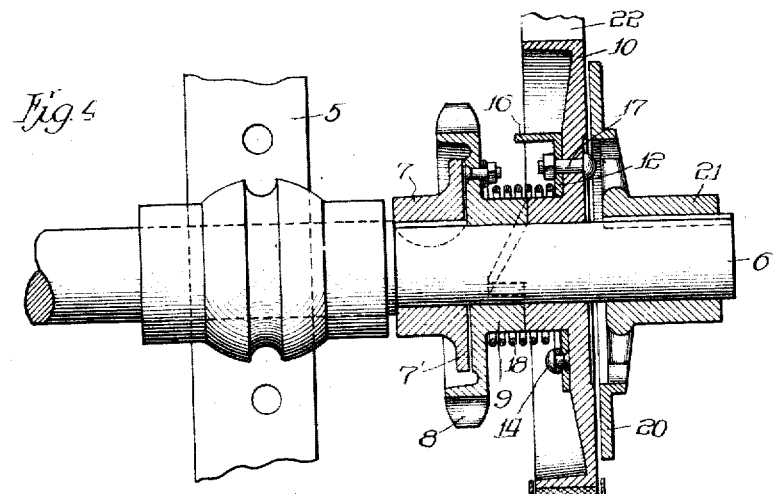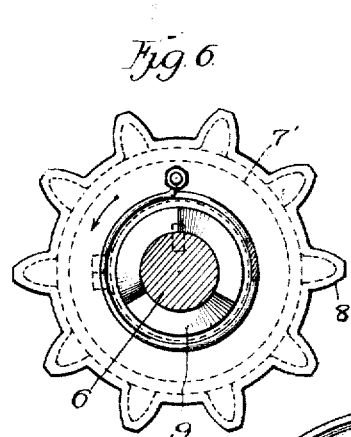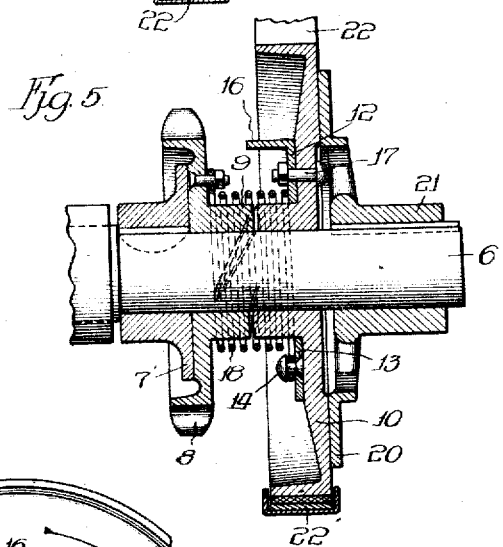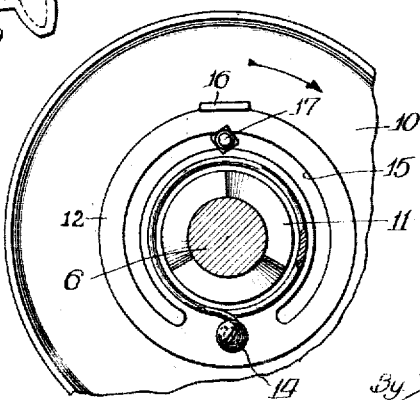

NORMAN R. KRAUSE, OF RACINE, WISCONSIN, ASSIGNOR TO J. I. CASE THRESHING MACHINE COMPANY, OF RACINE, WISCONSIN, A CORPORATION.

AUTOMATIC FRICTION-CLUTCH.

1,330,193.

Specification of Letters Patent. Patented Feb. 10, 1920.

Application filed April 8, 1918. Serial No. 227,208.

*To all whom it may concern:*

Be it known that I, NORMAN R. KRAUSE, a citizen of the United States, residing at Racine, in the county of Racine and State of Wisconsin, have invented certain new and useful Improvements in Automatic Friction-Clutches, of which the following is a specification.

My invention relates to automatic friction clutches for controlling driven mechanisms associated with machines for different purposes, but which is especially adapted for application to band cutters and feeders for threshing machines, and consists in certain details of construction and arrangements of parts of a simplified and positive character for the purpose, as will be hereinafter more particularly explained.

In the accompanying drawing, forming a part hereof, Figure 1 is an elevation, partly in section, of my improved clutch; Fig. 2 is also an elevation; Fig. 3 is a detail of a portion of said structure; Fig. 4 is a sectional view of a portion of the mechanism shown in Fig. 1 taken at right angles to the shaft on which it is mounted; Fig. 5 is a similar view showing some of the rotary elements in position different to that indicated in Figs. 1 and 4, and Figs. 6 and 7 are elevations showing the sprocket and wheel, respectively, forming parts of my improvement.

In said drawings the clutch is shown as applied to a threshing machine feeder, 5, a driving shaft, 6, therefor being provided with a disk collar, 7, 7'. Adjacent said disk 7' and loosely mounted upon said shaft is a sprocket, pulley or other power imparting element, 8, (a sprocket being shown for illustration) having affixed thereto a cam extension, 9, preferably embodying a stepped face. Also loosely mounted upon said shaft 6 is a wheel, 10, rotating in the direction indicated by the arrows in Figs. 2 and 7, having affixed thereto a cam extension, 11, the cam surface of which normally matches or registers with that of extension 9 as indicated by the full line in Fig. 1. Upon the inner side of said wheel 10, I secure a spring adjusting plate, 12, which is concentrically arranged therewith. Said plate has an opening, 13, therein and is also provided with a concentric slot, 15, and a projecting arm, 16. A screw or bolt, 17, passes through said slotted portion 15, serving to connect said plate to the wheel 10, and to lock and maintain the same in stationary relation to said wheel. One end of a torsion spring, 18, is attached to said adjusting plate, preferably by the screw 14, secured in the opening 13 and is coiled about cam members 9 and 11, its other end being secured to sprocket 8 in any suitable manner. At the outer end of said shaft 6 is a rotatable head, 20, embodying a hub, 21, which latter is keyed or otherwise fixedly secured to shaft 6, and which head is to be engaged by and rotated in the direction of said wheel 10 in a manner to be further explained. I associate with said wheel 10 a suitable stop or friction brake as, 22, which latter may be anchored, as at 23, then extended about said wheel 10 and connected to a lever, 24, or other actuating mechanism.

As will be readily understood, my improved clutch attachment is designed for operating other mechanism independently from that to which shaft 6 is directly connected, as, for instance, the sprocket or pulley 8 which communicates with another rotary element which it is desired to place in or out of operation while shaft 6 continues to operate.

In Figs. 1 and 2, the clutch mechanism is shown in inactive position, that is, due to an emergency which necessitated the cessation of rotation thereof the brake has become automatically set about wheel 10, so that said wheel and sprocket 8, being locked by the frictional engagement of cams 9 and 11, become substantially a unit, and, therefore, idle upon shaft 6, due to the resistance of said brake-band and the load assumed by the sprocket. Upon the instant said brake is released, said mechanism becomes transformed into a driven and driving element in the following manner. The opposite ends of spring 18 being connected to sprocket 8 and wheel 10, respectively, the moment said brake is released, the power of said spring produces a slight rotation of wheel 10 in the direction indicated by the arrows in Figs. 2 and 7 against rotating head 20, which is an extremely short movement because of the close proximity of the parts. Synchronously with this movement there is a camming effect upon the cams 9 and 11, in the direction of rotation of wheel 10, causing the inclined surfaces thereof to slide or climb upon each other, thus simultaneously crowding said wheel into frictional contact with head 20 and sprocket 8 against disk 7' so that each of these elements partake of the rotary action of said head and disk, and, being locked by the cams, constitute a unitary structure for imparting rotary motion to said sprocket. The rotation of wheel 10 maintains a constantly increasing contact of the inclined cam surfaces so that there is an absolutely positive frictional engagement between said wheel and rotary head 20 and the sprocket and disk, and the camming tendency of the cams through the rotary force imparted by wheel 10 insures direct and positive driving power to said sprocket. In this manner I am enabled by a comparatively slight amount of material and the inclined or pitched arrangement of the cam faces to produce a maximum frictional power with said cam surfaces, as the pressure therebetween is of a constantly increasing positive character, and, as will be understood, by graduating said surfaces in acute or prolonged arrangement, I am enabled to compensate for light or heavy power according to the exigencies of the mechanisms to be equipped with frictional actuating means of the character described.

Instantly upon the application of brake 22, or any suitable stopping device as heretofore indicated, the force of spring 18 and the sliding (through their inclined relationship) of cams 9 and 11 draw said wheel 10 and sprocket 8 into the position indicated in Figs. 1 and 4, the opposite assemblage heretofore related being indicated in Fig. 5. In this manner of arrangement I am enabled to supply an extremely sensitive but powerful driven element which is automatically and instantly set in actuating or inoperative position; according to the emergent necessities of complicated mechanisms such as are involved in the operation of threshing machinery.

It will be understood that for the specific purpose of governing the flow of straw into a threshing machine feeder, the mechanism connected with the sprocket or driver 8 is called upon to be actuated or not according to contingencies, and, therefore, my improved friction clutch as a whole, is subject to actuation accordingly.

As spring 18 is subject to distortion by the action of the cam members 9 and 11 it becomes desirable at times to increase its tension, which is readily accomplished by slightly loosening the nut on screw 17 so that by grasping the projecting arm 16 the spring adjusting plate 12 may be slightly turned and said spring thus wound or tightened and maintained in its adjusted position by retightening said screw 17.

I am aware that straw governors and automatic clutches for various purposes have been devised and which I do not broadly claim, but in actual practice I have demonstrated that my improved clutch is positive in its action, simple in operation, and readily responsive to the actualities incident to the varied requirements of a threshing machine feeder or like complicated machinery requiring control of certain of its actuating mechanisms independently of or in coöperation with the remainder, and which I accomplish, as indicated, by a simple cam arrangement involving slight material but yet so arranged as to impart powerful frictional engagement to the parts associated therewith, and which is positive in action at all times. As is well known, the power of frictionally engaging instrumentalities is usually negatived by the presence of oil upon the contacting surfaces thereof, which in the operation of some machinery is almost unavoidable from accident or surplusage of lubricating material finding its way to such parts, but in employing cam arrangements embodying inclined surfaces such as disclosed I have demonstrated that when oil is introduced upon such surfaces the full clutch power thereof is retained and no inefficiency whatever in this respect occurs, and also that when oil is applied between the contacting surfaces of head 20 and wheel 10, as well as between said cam faces, these parts grip more smoothly and are thus more efficient.

I claim as my invention:

1. In an automatic friction clutch, the combination, with a shaft, of a disk fixedly secured thereto, a driven element adjacent said disk and having a cam extension, a wheel embodying a cam extension adjacent said driven element, a torsional spring imposed between said driven element and said wheel, means associated with said wheel for increasing the tension of said spring, means adjacent said wheel against which the latter may be contacted and rotated thereby, and means for preventing and permitting the rotary movement of said wheel.

2. In an automatic friction clutch, a shaft, a rotatable head affixed thereto, a wheel on said shaft adapted to be contacted with said head, a cam associated with said wheel, a driven element on said shaft having a cam registering with said wheel cam, a disk adjacent said driven element and fixedly secured to said shaft, a spring adjusting plate associated with said wheel, a spring coiled about said cam extensions and connected to said plate and said driven element, and means for preventing and permitting the rotary movement of said wheel.

3. In an automatic friction clutch, a shaft, a driven element loosely mounted and slidable thereon, said driven element embodying a cam extension, a frictionally controlled wheel loosely and slidably mounted upon said shaft, said wheel embodying a cam extension registering with said first mentioned cam, means for frictionally contacting said wheel and rotating the same, means for frictionally contacting said driven element and rotating the same, and means for preventing and permitting the rotary movement of said wheel.

4. In an automatic friction clutch, a shaft, a rotatable head affixed thereto, a frictionally controlled shiftable wheel mounted upon said shaft adjacent said head, a spring adjusting plate associated with said wheel, a cam extension associated with said wheel, means for shifting said wheel to engage said head, and means for preventing and permitting the rotary movement of said wheel.

5. In an automatic friction clutch, a shaft, rotary driving means affixed thereto, means adapted to frictionally contact with said driving means and having a cam thereon, a disk affixed to said shaft, a driven element adjacent said disk having a cam thereon adapted to engage said first mentioned cam, and a spring connecting said driven element and said frictional contacting means for engaging and disengaging the latter in relation to said driving means, and brake mechanism for controlling the rotary movement of said frictional means.

6. In an automatic friction clutch, a brake wheel having a cam extension thereon, means for preventing and permitting the rotary movement of said wheel, a driven element having a cam extension contacting said first mentioned cam, a tension controlling spring communicating with said brake wheel and said driven element for shifting said wheel toward and from said driven element, and means for adjusting said spring.

7. In an automatic friction clutch, a rotary frictional engaging element embodying a cam member the face whereof is provided with inclined offsets, means for preventing and permitting the rotary movement of said element, a driven element embodying a cam member the face whereof is provided with inclined offsets, said cam faces registering with each other, means imposed between said frictional clutch element and said driven element for camming said cam faces to actuate one upon the other for shifting the same and the elements associated therewith, and means for adjusting said actuating means.

8. In an automatic friction clutch, a shaft, a frictionally controlled shiftable wheel mounted thereon, means for preventing and permitting the rotary movement of said wheel, an adjustable spring-tightener associated with said wheel, a driven element adjacent said wheel, and a spring communicating with said tightener and said driven element for controlling the movements thereof on said shaft in relation to said wheel.

9. In an automatic clutch, a shaft, a member rotatably secured thereto, a shiftable member mounted on said shaft adjacent said rotatable member, a cam associated with said shiftable member, means for preventing and permitting the rotary movement of said shiftable member, a spring adjuster mounted upon said shiftable member, a driven element mounted upon said shaft having a cam contacting with said first mentioned cam, and yielding means imposed between said shiftable member and said element for shifting said member and element along said shaft.

10. In an automatic friction clutch, a shaft, a head affixed thereto and rotating therewith, a wheel embodying a cam loosely mounted upon said shaft and shiftable longitudinally thereof into and out of contact with said head, means for controlling the rotary movement of said wheel, a driven element shiftably mounted upon said shaft having a cam registering with said wheel cam, a disk adjacent said driven element and fixedly secured to said shaft, and a spring communicating with said wheel and said driven element for imparting a shifting movement of said wheel and element into and out of the rotary influence of said fixed head and disk respectively.

In testimony whereof I affix my signature in the presence of two witnesses.

NORMAN R. KRAUSE.

Witnesses:
 HENRY F. CRANDALL,
 J. A. WALSH.